United States Patent Office 3,043,604
Patented July 10, 1962

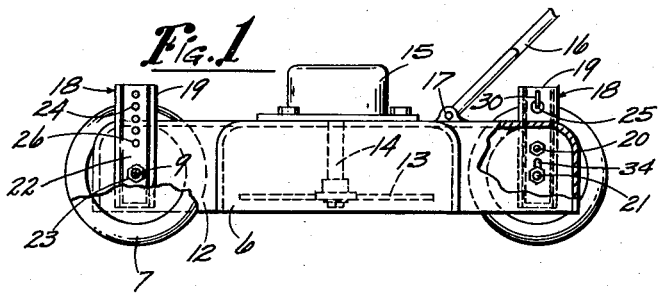
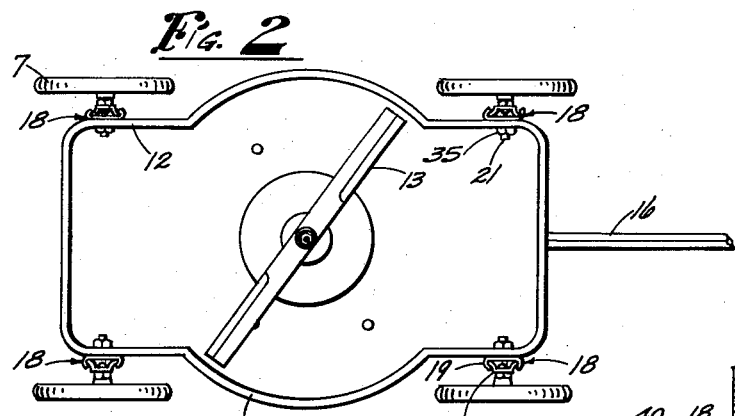
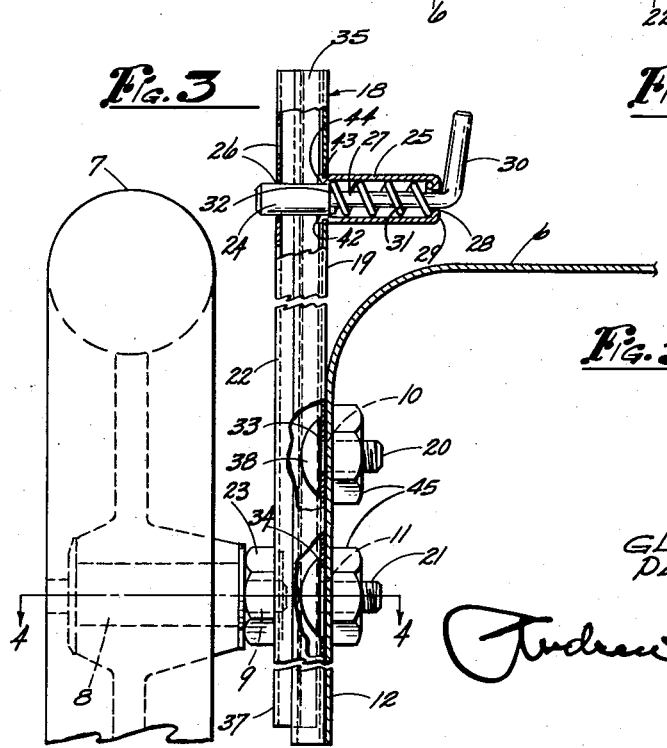
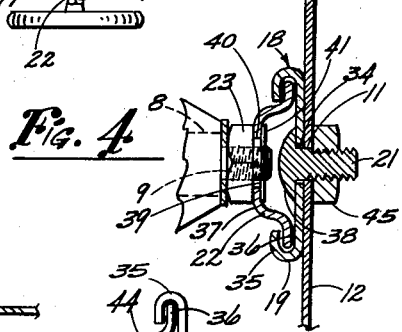
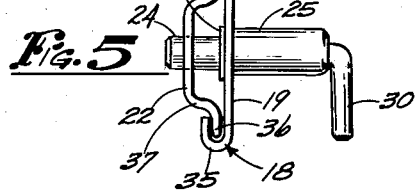
INVENTORS
GLENN R. REHNBERG
PAUL E. REHNBERG
ATTY.

3,043,604
HEIGHT ADJUSTER FOR ROTARY LAWN MOWERS
Glenn R. Rehnberg and Paul E. Rehnberg, Rockford, Ill., assignors to Custom Metal Products Corp., Rockford, Ill., a corporation of Illinois
Filed Apr. 17, 1961, Ser. No. 115,587
3 Claims. (Cl. 280—43)

This invention relates to a quick setting height adjuster for rotary lawn mowers.

Rotary mowers of the cheaper makes have vertically spaced holes in the side walls of the housing to permit setting the axle studs for the wheels at different elevations, to enable cutting the grass short, medium, or long depending on the wheel setting, but it is a time consuming and laborious task to change the setting, especially when the studs have become rusted. Consequently, most operators keep their mowers at one particular setting and, therefore, sacrifice the advantages to be gained by a change in setting and their lawns suffer accordingly. We are aware that others have proposed quick setting height adjusters but most of these constructions are too complicated and expensive and not really practical. The height adjuster of our invention avoids these objections to prior constructions, being of a simple and economical construction enabling resetting the housing height with respect to the four wheels easily in a couple of minutes, there being one of these height adjuster assemblies for each wheel, and it being necessary only to retract a spring-pressed pin and set it in the next hole above or below a given setting for a higher or lower setting of the housing with respect to the wheels.

In the height adjuster assembly of our invention the main parts are of light stamped sheet metal construction so formed as to eliminate any likelihood of getting battered or bent out of shape with rough usage and thereby failing to function properly. Each assembly consists of a channel shaped bracket having two vertically spaced holes in the web thereof to receive bolts for fastening permanently to the side wall of the housing, the axle stud being threaded into a nut fixed on the outside of a vertical slide plate of a channel shaped section that works in the channel of the bracket and provides clearance in its own channel for the heads of the bolts that fasten the bracket to the housing, a spring-pressed pin mounted on the back of the bracket above the housing for convenient manipulation being enterable in any one of a plurality of vertically spaced holes provided in the plate to support the housing at any selected elevation so that the rotary blade will cut the grass shorter or longer, as desired, and the operator after making a trial cut can change the setting easily before proceeding with his mowing job if the first setting is not satisfactory. Thus, the grass may be cut longer during a dry spell when a shorter cutting might prove injurious to the lawn. On the other hand, during a period of much rain when the grass grows faster, a shorter cutting is desirable since it saves labor by lengthening the intervals between mowings without injuring the lawn and without sacrificing anything in the appearance of the lawn.

The invention is illustrated in the accompanying drawing, in which—

FIGS. 1 and 2 are a side view and bottom view, respectively, of a rotary lawn mower equipped with quick setting hight adjusters made in accordance with our invention;

FIG. 3 is a front view of one of the height adjusters shown substantially full size, with intermediate portions of the length thereof broken away to conserve space and enable showing the parts on a larger scale;

FIG. 4 is a horizontal section on the line 4—4 of FIG. 3, and

FIG. 5 is an end view taken from the top of FIG. 3.

The same reference numerals are applied to corresponding parts throughout these views.

Referring to the drawing, the reference numeral 6 designates the housing of a rotary lawn mower supported at its four corners on wheels 7, which have their axles 8, in the conventional construction fastened by entry of their reduced threaded ends 9 directly in either one of two holes 10 and 11 provided in vertically spaced relation in the side wall 12 of the housing, a nut like either of the nuts 45 being provided on the inner side of the wall 12 to clamp the axle firmly in either setting by tightening of the nut, whereby to dispose the rotary cutter blade 13 at a higher or lower elevation with respect to the ground and accordingly cut the grass long or short. In some mowers, three vertically spaced holes are provided for as many different height settings to cut the grass long, short, or medium. The blade 13 is driven by a vertical shaft 14 extending downwardly from the motor 15 mounted on top of the housing 6. A handle 16 pivotally connected to the housing 6 at 17 is provided for pushing and pulling the mower in the usual way, and, in accordance with our invention, a quick setting height adjustment assembly 18 is provided in connection with each of the four wheels at the four corners of the housing 6 to provide not only a wider range of adjustability but also avoid the time consuming and laborious task of loosening and removing the nut from each of the axles 8 and replacing and retightening the same when it is desired to change the elevation of the housing 6 and blade 13 relative to the wheels.

Each assembly 18 comprises an elongated sheet metal bracket 19 vertically disposed with respect to a corner of the housing 6 and secured thereto by means of two short bolts 20 and 21, and an elongated sheet metal slide 22 having a nut 23 rigidly secured to the front of the lower end portion thereof and adapted to have the threaded end 9 of the wheel axle 8 threaded therein tightly for the mounting of the wheel 7 on the slide for vertical adjustability with respect to the bracket 19, a latch pin 24 being mounted in a sleeve 25 fixed to the back of the upper end portion of the bracket 19 and arranged to be engaged in either one of a plurality of keeper holes 26 provided in the upper end portion of the slide 22 in vertically spaced relation on the longitudinal center line thereof to lock the slide releasably in any selected position of adjustment, the pin 24 having a reduced elongated shank portion 27 projecting through a hole 28 in the outer end wall 29 of the sleeve and having a right angle bent end 30 serving both as a handle for withdrawal of the latch pin 24 from a hole 26, and as a stop for positively limiting forward movement of the pin under action of its coiled compression spring 31 that is housed in the sleeve 25 and seated at one end against the end wall 29 and at the other end against the annular shoulder 32 defined on the pin 24 around the reduced shank portion 27. The bolts 20 and 21 are entered in a hole 33 and vertically elongated slot 34, respectively, provided in the bracket 19 in vertically spaced relation on the longitudinal center line thereof and extend through the holes 10 and 11, respectively, in the side wall 12 of the housing 6 and have nuts 45 threaded on their protruding end portions and tightened against the inner side of the wall 12 to make the bracket 19 rigid with the housing, the elongation of slot 34 being sufficient to compenstae for anticipated differences in the spacing of holes 10 and 11 in the side walls of housings on different makes and models of mowers, thereby enabling substantially universal application of the present assembly on practically all makes and models of mowers now in use. The longitudinal edge portions 35 of the bracket 19 are bent inwardly to U or channel form to form guides for the longitudinal edge portions 36 of the slide 22, and the latter is stamped to channel form intermediate the edge portions 36 as indicated at 37 to provide ample clearance for the heads 38 of the bolts 20 and 21, even though the nut 23, as shown in FIG. 4, has a reduced hexagonal portion 39 projecting through a hexagonal hole 40 punched in the web of the channel 37, and the inner end portion 41 of the reduced hexagonal portion 39 of the nut is swedged over against the inside of the web of said channel, forming only a slight projection on the inner side thereof. The nut 23 is, therefore, held securely against turning. Sleeve 25 also has a reduced tubular end portion 42 entered in the hole 43 in the bracket 19, and the protruding inner end portion of the reduced portion 42 is swedged over against the inside of the bracket 19 as at 44 to fasten the sleeve 25 in place.

In operation, it should be clear that the owner of a rotary lawn mower can easily remove the nuts fastening the threaded ends 9 of the axles 8 and remove the wheels 7 from the housing 6 in order to apply the quick setting height adjustment assemblies 18 to the housing by means of bolts 20 and 21 and nuts 45, after which the ends 9 of the axles 8 can be secured to the nuts 23 by tight threading therein to mount the wheels 7 on the slides 22 for up and down adjustment to whatever elevation is desired. When a pin 24 is pulled out of one hole 24 and slide 22 is moved a little upwardly or downwardly, depending on which direction is desired, the pin will be shot under pressure of spring 31 into the next hole 24, thereby greatly expediting the adjustments, which are usually only one step up or down, to cut the grass shorter or longer. There is no need for sacrificing proper cutting of the grass just because it takes too much time and effort to change the elevation of the mower housing with respect to the wheels, because a change in setting can be made easily in a couple of minutes with the present quick setting height adjustment. Hence, better lawns are definitely insured, because a conscientous operator making the adjustments intelligently in relation to weather, if it is a dry spell or a wet spell, can keep his lawn in the best possible condition and best appearance at all times, and, under given conditions, can do so without the need for as frequent mowings as would otherwise be necessary. With very little instruction, the average youngster should have no difficulty in making the necessary adjustments. In conclusion, the present assemblies 18, even though fabricated mainly from fairly thin sheet metal, are quite rugged and durable due partly to the channel forming of the edge portions 35 of the bracket 19 and channel forming of the middle portion 37 of the slide 22, and due also to the way in which these two parts 19 and 22 fit together, thereby substantially reinforcing one another. As a result, therefore, there is no likelihood of the parts becoming bent or battered even with the roughest service, but the chances are that these assemblies will outlast the mower to which they are applied and can, therefore, be removed from an old one and placed on a new one. Here again, the universal adaptability to different makes and models of mowers is an important advantage.

It is believed the foregoing description conveys a good understanding of the objects and advantages of our invention. The appended claims have been drawn to cover all legitimate modifications and adaptations.

We claim:

1. An adjustable wheel mounting means attachment for a mower of the kind wherein an axle for a wheel has a threaded end that is entered selectively in either one of a plurality of vertically spaced holes in the side wall of the housing of the mower and secured therein with a nut for mounting the wheel thereon at different elevations relative to said housing, said mounting means attachment comprising, in combination with said threaded axle and said vertically spaced holes, of an elongated vertical bracket member having vertically spaced bolt holes provided in the lower end portion thereof arranged to register with the aforesaid vertically spaced holes in the housing wall, bolts entered in these registering holes and receiving nuts threaded thereon to fasten said bracket rigidly on said housing, an elongated vertical slide member slidably adjustable vertically on said bracket member, a nut mounted rigidly on the lower end portion of said slide in which the threaded end of said axle is received and secured for rigid mounting on said slide, said slide member having a plurality of holes provided in the upper end portion thereof in vertically spaced relation, and a horizontal spring-pressed latch pin mounted on the upper end portion of said bracket member above and spaced relative to said housing and engageable selectively in either of said holes in said slide member to lock the slide member in either of various positions of vertical adjustment.

2. A structure as set forth in claim 1 wherein said bolts have heads that project from said bracket member, and wherein said elongated bracket member and elongated slide member are both made of sheet metal, the longitudinal edge portions of one of said members being bent to channel form slidably receiving the longitudinal edge portions of the other of said members, and wherein at least one of said members is bent to channel form in cross-section between the longitudinal edge portions to provide working clearance for said slide member relative to the heads of the aforesaid bolts.

3. A structure as set forth in claim 2, wherein the nut mounted on the slide has mounting means forming a projection on the inner side of the slide, and wherein the threaded end of the axle in threading into said nut has the extremity thereof projecting from the inner side of said slide, the channel of one of said members being deep enough to provide working clearance for these projections relative to the heads of said bolts.

References Cited in the file of this patent

UNITED STATES PATENTS

| | | |
|---|---|---|
| 832,628 | Schreffler | Oct. 9, 1906 |
| 2,338,351 | Parrish | Jan. 4, 1944 |
| 2,381,202 | Bowen et al. | Aug. 7, 1945 |
| 2,629,609 | Wilson | Feb. 24, 1953 |
| 2,879,074 | Roberton et al. | Mar. 24, 1959 |